United States Patent
Sumizawa (10) Patent No.: US 7,653,482 B2
(45) Date of Patent: Jan. 26, 2010

(54) ON-VEHICLE NAVIGATION APPARATUS AND SUBJECT VEHICLE POSITION CORRECTION METHOD

(75) Inventor: Akio Sumizawa, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 498 days.

(21) Appl. No.: 11/597,937

(22) PCT Filed: Mar. 24, 2005

(86) PCT No.: PCT/JP2005/005382

§ 371 (c)(1),
(2), (4) Date: Nov. 29, 2006

(87) PCT Pub. No.: WO2005/119177

PCT Pub. Date: Dec. 15, 2005

(65) Prior Publication Data

US 2008/0077322 A1    Mar. 27, 2008

(30) Foreign Application Priority Data

Jun. 2, 2004    (JP) ................ 2004-164744

(51) Int. Cl.
  *G01C 21/00*    (2006.01)
(52) U.S. Cl. .................................... 701/200
(58) Field of Classification Search ............ 701/201, 701/207–211; 340/998, 990, 995, 995.15
See application file for complete search history.

(56) References Cited

U.S. PATENT DOCUMENTS 6,385,536 B2 *   5/2002   Kimura ............... 701/209
2001/0056326 A1  12/2001  Kimura

FOREIGN PATENT DOCUMENTS

| JP | 6-94470 A | 4/1994 |
|---|---|---|
| JP | 9-152348 A | 6/1997 |
| JP | 2000-241182 A | 9/2000 |
| JP | 2001-289654 A | 10/2001 |
| JP | 2001-330455 A | 11/2001 |
| JP | 2004-138427 A | 5/2004 |

OTHER PUBLICATIONS

International Search Report dated Jul. 12, 2005 (Two (2) pages).

* cited by examiner

*Primary Examiner*—Kim T Nguyen
(74) *Attorney, Agent, or Firm*—Crowell & Moring LLP (57) ABSTRACT

An on-vehicle navigation apparatus comprises a subject vehicle position detection unit that detects a position of a subject vehicle and a direction along which the subject vehicle is advancing, a road marker line detection unit that detects a road marker line in an image of a road captured with a camera, a map matching candidate identifying unit that identifies a road to be designated as a map matching candidate, a decision-making unit that makes a decision as to whether or not the subject vehicle is traveling on the road identified by the map matching candidate identifying unit, a map matching unit that correct the detected subject vehicle position so as to set the subject vehicle position onto the road on which the subject vehicle is determined to be traveling, and a subject vehicle position indicating unit that indicates the subject vehicle position having been corrected.

3 Claims, 7 Drawing Sheets

FIG.7

ON-VEHICLE NAVIGATION APPARATUS AND SUBJECT VEHICLE POSITION CORRECTION METHOD

TECHNICAL FIELD

The present invention relates to an on-vehicle navigation apparatus that indicates the subject vehicle position on a roadmap by adopting a map matching technology.

BACKGROUND ART

A known map matching technology is adopted in an on-vehicle navigation system when indicating the subject vehicle position on a roadmap so as to ensure that the subject vehicle indicated on display never erroneously assumes an off road position by correcting the subject vehicle position detection results provided by a GPS, a gyro and the like in correspondence to the road layout. However, over an area such as an area around a branching point, where a plurality of roads are present in close proximity to one another, it may not always be possible to accurately determine to which road the subject vehicle position detection results should be corrected in conjunction with this map matching technology. Under such circumstances, the subject vehicle may be initially indicated on a road on which it is not traveling and then the subject vehicle position may be abruptly switched onto the road on which it is actually traveling. This phenomenon is referred to as position jump.

There is a navigation system known in the related art that has a function (auto-reroute function) of automatically searching for a new recommended route relative to the current subject vehicle position if the subject vehicle position moves out of the initial recommended route. If the position jump phenomenon described above occurs while the subject vehicle is traveling on the recommended route, causing the subject vehicle position to be briefly indicated to be off the recommended route and then be indicated on the recommended route again, an auto-reroute will be executed at each of the subject vehicle positions indicated on the map in the navigation system. The user will find this redundant execution of auto-reroute distracting and confusing. A route guiding apparatus in the known art (see patent reference literature 1) prevents such redundant auto-reroute execution by disallowing the auto-reroute in situations in which the position jump phenomenon is likely to occur.

Patent reference literature 1: Japanese Laid Open Patent Publication No. 2000-241182

The route guiding apparatus disclosed in patent reference literature 1 disallows the auto-reroute when there is a plurality of map matching candidate roads, e.g., when the subject vehicle is traveling in an area around a branching point. As a result, even if the current vehicle position is briefly indicated to be off the recommended route due to the position jump phenomenon, the auto-reroute is not executed.

DISCLOSURE OF THE INVENTION

Problems to be Solved by the Invention

However, a problem arises in the route guiding apparatus described above in that the auto-reroute is not executed even when the subject vehicle is actually off the recommended route in an area containing a plurality of map matching candidate roads.

MEANS FOR SOLVING THE PROBLEMS

The on-vehicle navigation apparatus according to the present invention comprises a subject vehicle position detection means for detecting a position of a subject vehicle and a direction along which the subject vehicle is advancing, a road marker line detection means for detecting a road marker line in an image of a road ahead of or behind the subject vehicle captured with a camera, a map matching candidate identifying means for identifying a road to be designated as a map matching candidate based upon the subject vehicle position and the subject vehicle advancing direction detected by the subject vehicle position detection means, a decision-making means for making a decision based upon results of road marker line detection by the road marker line detection means as to whether or not the subject vehicle is traveling on the road identified by the map matching candidate identifying means, a map matching means for correcting the subject vehicle position detected by the subject vehicle position detection means so as to set the subject vehicle position onto the road on which the subject vehicle is determined by the decision-making means to be traveling, and a subject vehicle position indicating means for indicating the subject vehicle position having been corrected by the map matching means on a roadmap.

In the on-vehicle navigation apparatus described above, it is desirable that the map matching candidate identifying means identifies a plurality of roads branching from a single branching point as map matching candidate roads, each of the plurality of roads being present within a predetermined distance range from the subject vehicle position and extending along a direction with an angle within a predetermined angle range relative to the subject vehicle advancing direction. It is also desirable that when the decision-making means determines that the subject vehicle is traveling on one of the plurality of roads identified by the map matching candidate identifying means and that the subject vehicle is not traveling on any other road, the map matching means corrects the subject vehicle position so as to set the subject vehicle position on the road on which the subject vehicle is determined by the decision-making means to be traveling.

In the on-vehicle navigation apparatus, it is preferably that the decision-making means is configured to determine that the subject vehicle is traveling on a single road among the plurality of roads by determining a lane in which the subject vehicle has traveled up to the branching point based upon a positional relationship among a plurality of road marker lines detected by the road marker line detection means.

And, in the on-vehicle navigation apparatus described above, the decision-making means may be configured to make a decision as to whether or not the subject vehicle has moved over a road marker line based upon results of road marker line detection by the road marker line detection means, and the decision-making means may determine that the subject vehicle is not traveling on the road having been identified by the map matching candidate identifying means if the subject vehicle is judged to have moved over a road marker line.

In the on-vehicle navigation apparatus, it is desirable that the decision-making means is configured to make a decision as to whether or not the subject vehicle is traveling within a lane based upon a positional relationship indicated on a screen with regard to a plurality of road marker lines detected by the road marker line detection means, and the decision-making means determine that the subject vehicle is traveling on the road having been identified by the map matching candidate identifying means if the subject vehicle is judged to be traveling within a lane regardless of results of the decision as to whether or not the subject vehicle has moved over a road marker line.

EFFECT OF THE INVENTION

According to the present invention, the subject vehicle position and the subject vehicle advancing direction are detected and a specific road to be designated as a map matching candidate is determined based upon the subject vehicle position and the subject vehicle advancing direction having been detected. Then, based upon the results of road marker line detection executed by using a captured image of a road ahead of or behind the subject vehicle, a decision is made as to whether or not the subject vehicle is currently traveling on the map matching candidate road having been determined. Based upon the results of the decision, map matching processing is executed in coordination with the road on which the subject vehicle has been judged to be traveling and the corrected subject vehicle position is thus indicated on the roadmap. As a result, the subject vehicle position can be accurately indicated on the road even when there is a plurality of map matching candidate roads. The auto-reroute can then be executed based upon the subject vehicle position indicated on the map display.

BEST MODE FOR CARRYING OUT THE INVENTION

First Embodiment

Figure 1:
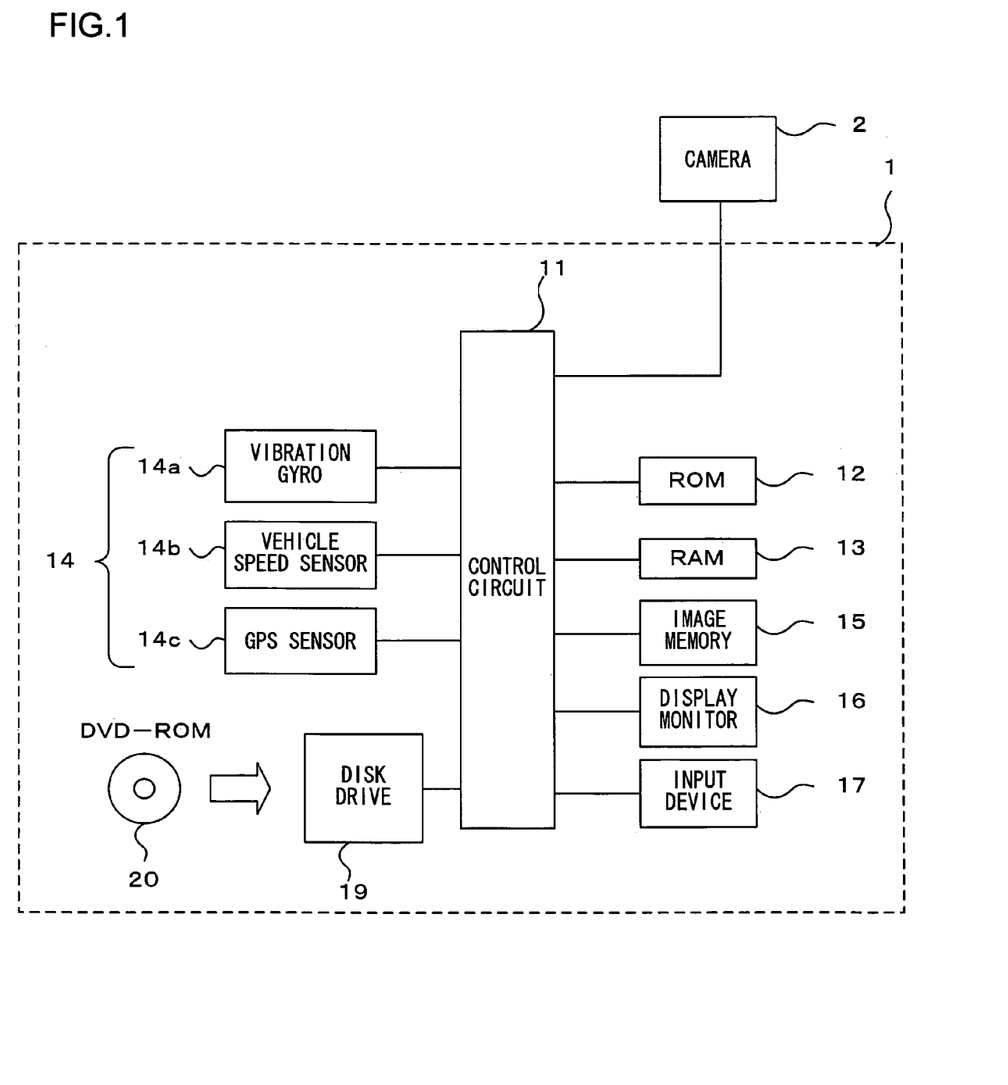
FIG. 1 is a block diagram showing the structure adopted in the navigation system achieved in an embodiment of the present invention.

FIG. 1 shows the structure of the navigation system achieved in an embodiment of the present invention. A navigation system 1 in FIG. 1 accurately indicates the subject vehicle position on a road with improved map matching accuracy by using captured images of the road ahead of the subject vehicle. It is to be noted that the navigation system 1, installed for use in a vehicle, is capable of guiding the subject vehicle to a destination having been set by displaying a roadmap. The navigation system 1 includes a control circuit 11, a ROM 12, a RAM 13, a current position detection device 14, an image memory 15, a display monitor 16, an input device 17 and a disk drive 19. A camera 2 is connected to the control circuit 1, and a DVD-ROM 20 having recorded therein map data is loaded into the disk drive 19.

The control circuit 11, constituted with a microprocessor and its peripheral circuits, uses the RAM 13 as its work area when executing a control program stored in the ROM 12 to implement various types of processing and control. The current position detection device 14, which detects the current position of the subject vehicle, i.e., the subject vehicle position, and the advancing direction of the subject vehicle, i.e., the subject vehicle advancing direction, may comprise, for instance, a vibration gyro 14a that detects a change in the direction of the subject vehicle, a vehicle speed sensor 14b that detects the vehicle speed, a GPS sensor 14c that detects a GPS signal transmitted from a GPS satellite and the like. It is to be noted that the subject vehicle position detected with the current position detection device 14 is corrected based upon the actual road layout through map matching processing of the known art executed in the control circuit 11.

The image memory 15 temporarily holds image data to be displayed at the display monitor 16. The image data include roadmap drawing data and various types of graphic data used to display the roadmap, which are created by the control circuit 11 based upon the map data recorded in the DVD-ROM 20. By using the image data having been generated and then output from the control circuit 11 to the image memory 15, the roadmap is displayed at the display monitor 16 and the subject vehicle position is indicated on the roadmap on display.

The input device 17 includes various input switches with which the user sets a destination and waypoints (hereafter collectively referred to as a destination) for the vehicle. Such an input device 17 may be an operation panel or a remote-control device. By operating the input device 17 as prompted by screen instructions displayed at the display monitor 16, the user is able to set a destination by specifying its geographical name, its position on the map or the like.

The disk drive 19 reads out map data to be used to display the roadmap from the DVD-ROM 20 loaded therein. The map data include route calculation data used in route search, route guidance data indicating intersection names, road names and the like to be used when guiding the subject vehicle to the destination along the recommended route and road data indicating roads. The map data also include background data indicating shapes of entities other than the roads on the map, such as rivers, railway tracks and various facilities (landmarks) on the map.

The smallest unit of road data indicating a road segment is referred to as a link. Each road is made up of a plurality of links. A point at which links connect with each other is referred to as a node, which holds position information (coordinate information). Based upon the position information held at the nodes, the shape of each link, i.e., the shape of the corresponding road segment, is determined. It is to be noted that while an explanation is given on an example in which the map data are read out from a DVD-ROM, the map data may instead be read out from a recording medium other than a DVD-ROM, such as a CD-ROM or a hard disk.

The camera 2 is installed at a position at which it is able to capture an image of the road ahead of the subject vehicle. The captured images provided by the camera 2 are output to the control circuit 11 as image data at a predetermined frame rate. The control circuit 11 executes white line extraction processing to be explained later by using the captured image data of the road ahead of the subject vehicle output from the camera 2 and determines the lane on which the subject vehicle is currently traveling. It is to be noted that the camera 2 may be, for instance, a CCD camera.

As the user sets the destination by operating the input device 17, a route search for a route from the current position to the destination is executed through arithmetic processing of the known art with a predetermined algorithm based upon the route calculation data mentioned earlier by designating the subject vehicle position having been corrected through map matching processing as the route search start point. The recommended route resulting from the processing thus executed is indicated on the map on display by altering its display mode, e.g., by using a different display color, so as to ensure that it can easily be distinguished from the other roads. As a result, the user is able to identify the recommended route on the map displayed at the display monitor 16. In addition, the navigation system 1 guides the subject vehicle along the recommended route by providing the user with visual or audio instructions along the advancing direction. Thus, the navigation system 1 provides route guidance to the destination by indicating the recommended route on the roadmap and guiding the subject vehicle to the destination along the recommended route.

The navigation system 1 has an auto-reroute function that allows it to automatically execute reroute processing upon judging that the subject vehicle position has moved off the recommended route during the route guidance to the destination. Under such circumstances, a route search for a route to the destination is executed again in reference to the subject vehicle position having moved off the recommended route and the subsequent route guidance is provided along the new recommended route resulting from the route search. Through this auto-reroute function, the navigation system 1 is able to carry on the route guidance to the destination even when the subject vehicle moves away from the recommended route.

When correcting the subject vehicle position so as to set it on a road through map matching processing, a map matching candidate road is identified based upon the subject vehicle position and the subject vehicle advancing direction detected via the current position detection device 14. More specifically, a road present within a predetermined distance range from the detected subject vehicle position and extending along a direction running with an angle less than a predetermined angle relative to the subject vehicle advancing direction is designated as the map matching candidate. Such a map matching candidate road is identified based upon the map data recorded in the DVD-ROM 20 and the subject vehicle position is adjusted onto the road. It is to be noted that the current map matching processing is executed to determine the corrected the subject vehicle position by taking into consideration the subject vehicle position having been corrected through the previous map matching processing.

However, in an area where a plurality of roads are present in close proximity to one another, as in an area around a branching point, all the roads may be identified as map matching candidates through the map matching candidate road identification method in the related art described above. In such a case, since the correct road onto which the subject vehicle position should be set cannot be determined, the position jump phenomenon tends to occur. It is to be noted that the term "position jump" in this context refers to a phenomenon whereby the subject vehicle position indicated on a road on which the subject vehicle is not actually traveling is abruptly switched onto the road on which the subject vehicle is traveling. Such position jump gives rise to redundant auto-reroute execution when the subject vehicle actually stays on the recommended route, i.e., an auto-reroute is executed when the post map matching subject vehicle position is indicated at a point off the recommended route and another auto-reroute is executed as the subject vehicle position moves back onto the initial road. The user is bound to find such redundant auto-reroute execution attributable to position jump distracting and confusing.

Accordingly, the navigation system 1 in the embodiment prevents the position jump phenomenon described above even when there is a plurality of map matching candidate roads by judging the lane on which the subject vehicle is traveling based upon the images captured by the camera 2 and executing the map matching processing to set the subject vehicle position on one of the roads. The specific method adopted in the embodiment is explained below.

Figure 2:
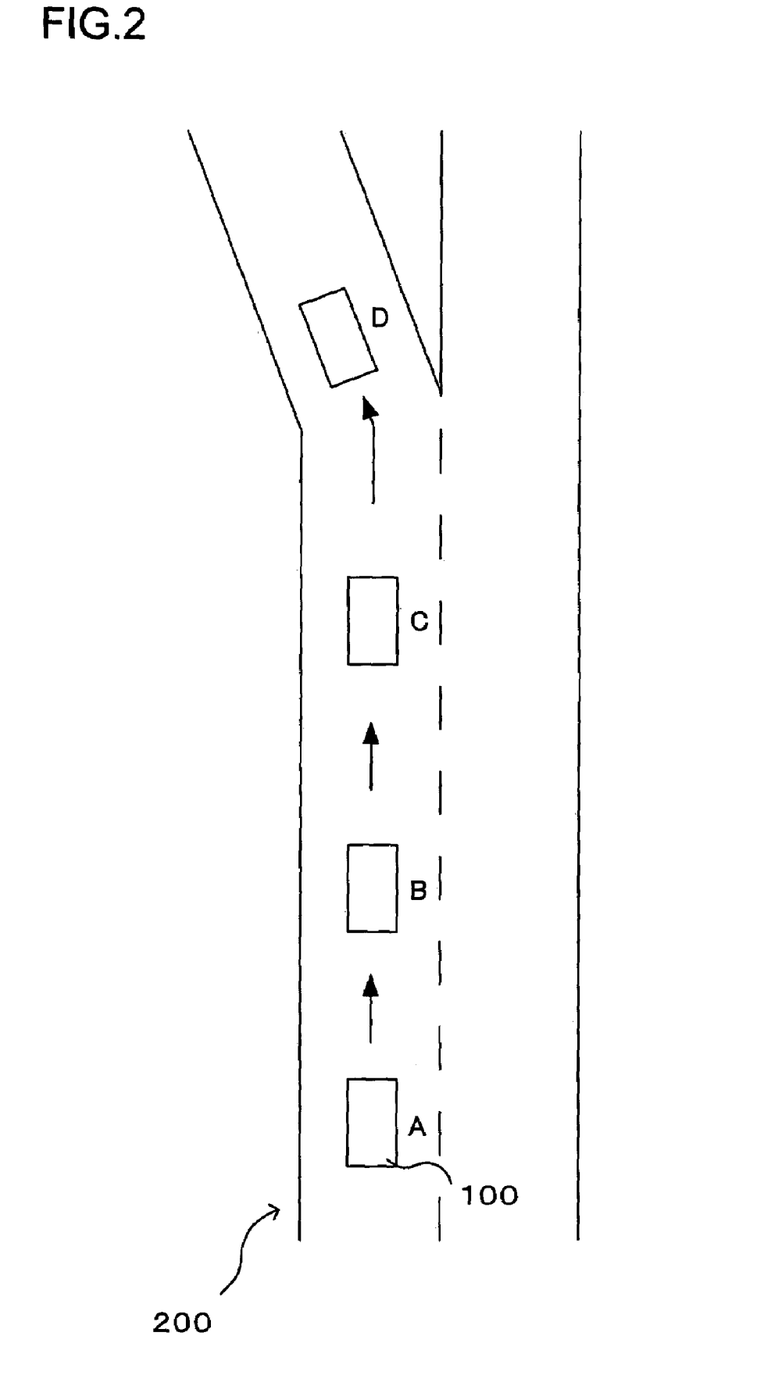
FIG. 2 is an illustration of a vehicle traveling on a road with a branching point ahead.
Figure 3:
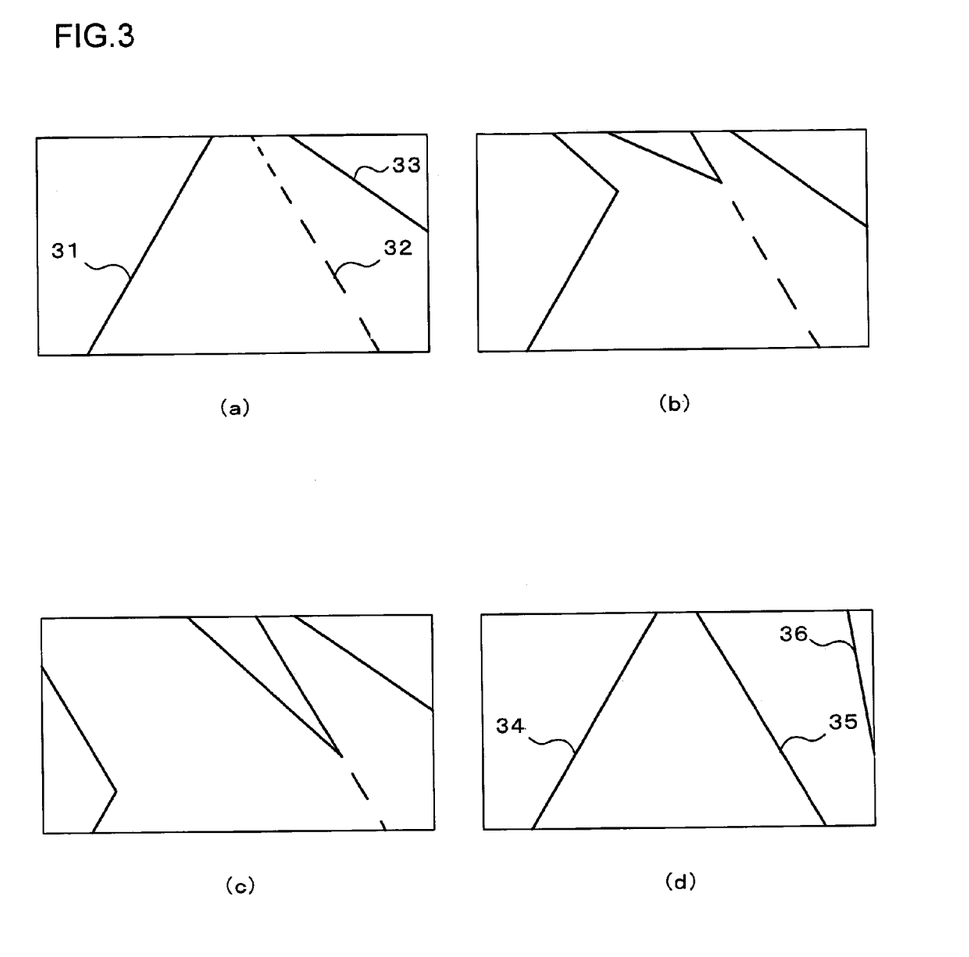
FIG. 3 is examples of images that may be captured with the camera as the vehicle travels, as illustrated in FIG. 2.

FIG. 2 illustrates a vehicle traveling on a road with a branching point. It is assumed that a subject vehicle 100 traveling in the bottom to top direction on a road 200 that branches into two roads, travels on the left-side lane up to the branching point and that it then moves into the road branching out to the left side beyond the branching point. The navigation system 1 and the camera 2 in FIG. 1 are mounted at the subject vehicle 100. FIG. 3 presents examples of images that may be captured by the camera 2 under the circumstances shown in FIG. 2, i.e., images of the road ahead of the subject vehicle 100. The captured images in FIGS. 3(a), 3(b), 3(c) and 3(d) are respectively captured at subject vehicle positions A, B, C and D in FIG. 2.

The navigation system 1 executes road marker line detection processing for detecting road marker lines on the road by using the captured images shown in FIG. 3. This road marker line detection processing may be achieved by, for instance, executing edge extraction processing for extracting edges in each image. Road marker lines 31, 32 and 33, for instance, are detected from the captured image in FIG. 3(a) through the road marker line detection processing.

After the road marker lines on the road are detected through the road marker line detection processing as described above, the navigation system 1 determines the lane on which the subject vehicle 100 is currently traveling based upon the detection results. For instance, through the road marker line detection executed on the captured image in FIG. 3(a), the road marker lines 31 and 32 are detected at positions that are symmetrical with respect to each other to the left and right relative to the center of the image and the road marker line 33 is detected further to the right relative to the road marker line 32. Based upon the positional relationship among the individual road marker lines, the subject vehicle 100 can be judged to be traveling in the left-side lane. It is desirable that the number of lanes on the road on which the subject vehicle is traveling be ascertained in advance by referencing information indicating the number of lanes, which is recorded in the map data when determining the specific lane through the lane judgment processing.

By executing the road marker line detection processing and the lane judgment processing described above on the captured images in FIGS. 3(b) and 3(c), the subject vehicle 100 is judged to be still traveling in the left-side lane. Once it is determined that the vehicle is traveling in the left-side lane before reaching the branching point, the vehicle can then be determined to be traveling on the left side road extending from the left-side lane beyond the branching point. It is to be noted that the correspondence between the lanes leading to the branching point and the roads beyond the branching point can be determined based upon the map data.

Even when a plurality of roads have been identified as map matching candidates, a single road among them can be judged to be the road on which the subject vehicle is traveling and it can be judged that the subject vehicle is not traveling on the other road, by executing the processing explained above. Then, map matching processing is executed to correct the subject vehicle position so as to set it onto the road on which the subject vehicle is judged to be traveling and, as a result, no position jump occurs in the area near the road branching point.

Figure 4:
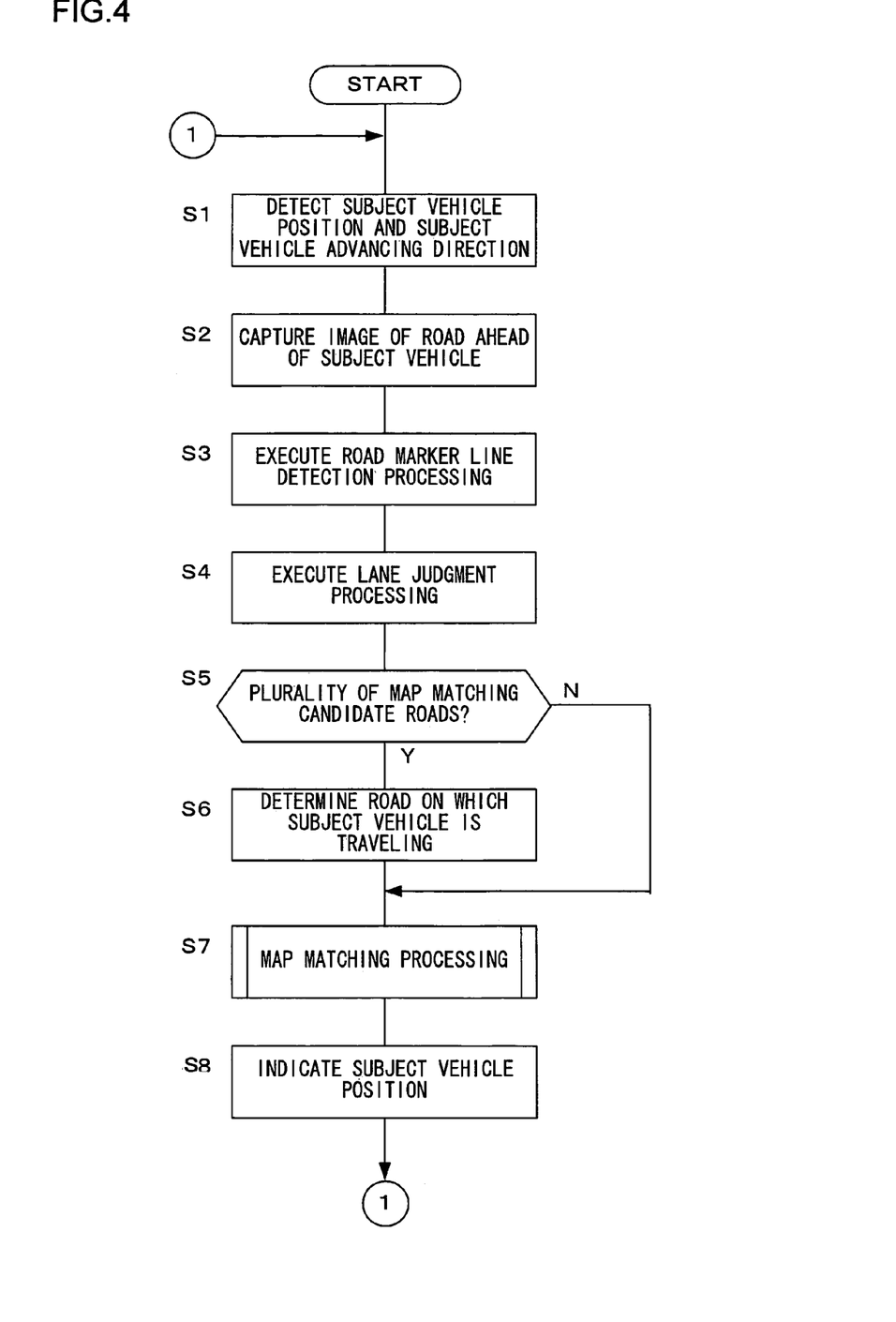
FIG. 4 is a flowchart of the map matching processing executed in the first embodiment.

FIG. 4 presents a flowchart of the map matching processing executed in the embodiment. The processing in the flowchart is executed constantly in the control circuit 11 over predetermined processing intervals while the roadmap is on display at the display monitor 16. In step S1, the subject vehicle position and the subject vehicle advancing direction are detected by the current position detection device 14. It is to be noted that since the map matching processing has not been executed yet at this point in time, the subject vehicle position is still uncorrected and thus may not be set on a road.

In step S2, an image of the road ahead of the subject vehicle is captured by the camera 2. In step S3, the road marker line detection processing described earlier is executed by using the image having been captured in step S2. In step S4, the lane judgment processing described earlier is executed based upon the results of the road marker line detection processing having been executed in step S3.

In step S5, a decision is made as to whether or not there is a plurality of map matching candidate roads. In this step, each map matching candidate road is identified through the method explained earlier based upon the subject vehicle position and the subject vehicle advancing direction having been detected in step S1. If two or more map matching candidate roads have been identified, the operation proceeds to step S6, whereas if a single map matching candidate road has been identified, the operation proceeds to step S7.

It is to be noted that if no road is identified as a map matching candidate in step S5, the processing in step S6 or step S7, to be explained next, cannot be executed. Accordingly, the operation may proceed from step S5 step S8 under such circumstances to indicate the subject vehicle position on the roadmap as was detected in step S1, which may be an off road point.

In step S6, a specific road on which the vehicle is currently traveling is selected from the plurality of map matching candidates, as explained earlier, based upon the results of lane judgment processing having been executed in step S4. In step S7, map matching processing of the known art is executed based upon the subject vehicle position and the subject vehicle advancing direction having been detected in step S1. If it has been decided in step S5 that there is a plurality of map matching candidate roads, the map matching processing is executed for the single road on which the subject vehicle has been judged to be traveling in step S6. Through the map matching processing executed in step S7, the subject vehicle position is corrected and set on the road on which it is traveling.

In step S8, the subject vehicle position is indicated on the roadmap on display at the display monitor 16 based upon the subject vehicle position having been corrected through the map matching processing having been executed in step S7. With the map matching accuracy thus improved by using the captured image of the road ahead of the subject vehicle, the subject vehicle position can be accurately indicated on the road on which the subject vehicle is actually traveling and position jump can be prevented even in an area where a plurality of roads are present in close proximity to one another, e.g., around a branching point.

The following advantages are achieved in the first embodiment described above.

(1) The subject vehicle position and the subject vehicle advancing direction are detected (step S1), and road marker lines are detected from the image of the road ahead of the subject vehicle captured with the camera 2 (step S3). Based upon the subject vehicle position and the subject vehicle advancing direction thus detected, a road to be designated as a map matching candidate is identified (step S5). If a plurality of roads are determined as map matching candidates, the specific road on which the subject vehicle is traveling is judged based upon the results of the road marker line detection (step S6). Then, map matching processing is executed based upon the results of the judgment so as to set the subject vehicle position on the road on which the subject vehicle has been judged to be traveling (step S7) and the corrected subject vehicle position is indicated on the roadmap (step S8). Thus, even when there is a plurality of map matching candidate roads, the subject vehicle position can be accurately indicated on the correct road. As a result, auto-reroute processing can be executed based upon the subject vehicle position indicated on the road.

(2) The road on which the subject vehicle is currently traveling is determined from among the plurality of roads branching from a single branching point, which have been identified as map matching candidate roads (step S6). Then, map matching processing is executed so as to adjust the subject vehicle position on the road thus determined (step S8). Consequently, the subject vehicle position is accurately corrected and set onto one of the roads branching from the branching point, which makes it possible to prevent position jump in the area around the branching point.

(3) The lane in which the subject vehicle travels up to the branching point is determined based upon the positional relationship among a plurality of road marker lines detected in the captured image (step S4). Then, in correspondence to the lane thus determined, a specific road is judged to be the road on which the subject vehicle is currently traveling (step S6). As a result, the road on which the subject vehicle is traveling can be judged with ease and accuracy by using the captured image.

It is to be noted that the lane on which the subject vehicle travels up to the branching point is determined by using the image captured by the camera 2 and then based upon the lane thus determined, one of the roads extending beyond the branching point is judged to be the road on which the subject vehicle travels beyond the branching point in the embodiment described above. However, the road on which the subject vehicle is traveling may be judged through a method other than this.

For instance, the road on which the subject vehicle is currently traveling may be determined based upon an image photographed at a point beyond the branching point. The captured image in FIG. 3(d), for instance, shows road marker lines 34 and 35 on the left side road on which the subject vehicle 100 is traveling and a road marker line 36 on the right side road. As the road marker line 36 is detected at a position further to the right relative to the road marker lines 34 and 35, it can be ascertained that the subject vehicle having passed the branching point is now traveling on the left side road. In this method, the road on which the subject vehicle is traveling can be judged based upon the positional relationship among the plurality of road marker lines detected in the image captured at a point beyond the branching point.

Alternatively, the road on which the subject vehicle having passed the branching point is traveling can be determined based upon an image photographed at a point immediately before the branching point. At the branching point, two road marker lines normally overlap to become a single road marker line that is thicker compared to other road marker lines. By detecting the position of the merged road marker line, which is thicker than the other road marker lines, to determine whether the merged line extends to the left or to the right of the subject vehicle, the direction to which the subject vehicle travels beyond the branching point, i.e., to the left or to the right relative to the branching point, can be judged. Through this method, too, the road on which the subject vehicle travels beyond the branching point can be determined.

Second Embodiment

The second embodiment of the present invention is now explained. The navigation system achieved in this embodiment prevents a phenomenon whereby the subject vehicle position is erroneously indicated on a road through map matching when the subject vehicle having entered a parking area or the like on the roadside is not actually traveling on the road. It is to be noted that since the navigation system achieved in the embodiment adopts a structure identical to that shown in FIG. 1 in reference to which the first embodiment has been explained its explanation is omitted.

Figure 5:
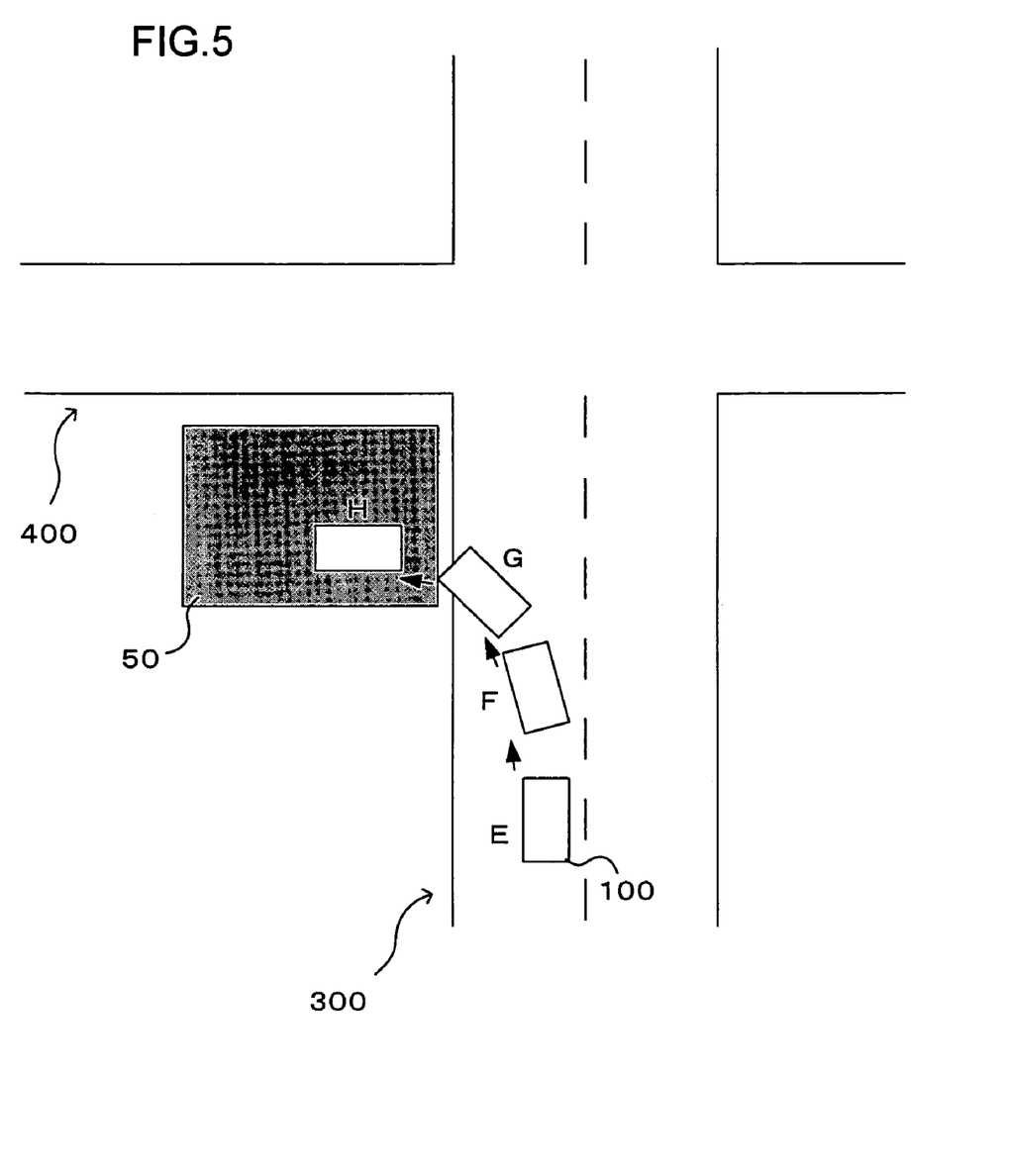
FIG. 5 is an illustration of a vehicle entering a parking area on the left side of the road.

Let us now assume that the subject vehicle 100, having been traveling on a road 300, has turned left and entered a parking area 50 on the side of the road 300 as shown in FIG. 5. The road 300 intersects a road 400 beyond the parking area 50. Under such circumstances, if the distance between the point at which the subject vehicle 100 has turned left and the road 400 is within a predetermined distance range set for the map matching candidate road selection, the road 400 is sometimes designated as a map matching candidate, resulting in an erroneous indication of the subject vehicle position on the road 400 in the related art. Accordingly, no map matching processing is executed in the embodiment if the subject vehicle is detected to have moved over a road marker line along the road. The phenomenon described above is prevented through these measures. The specific method adopted in the embodiment is explained below.

Figure 6:
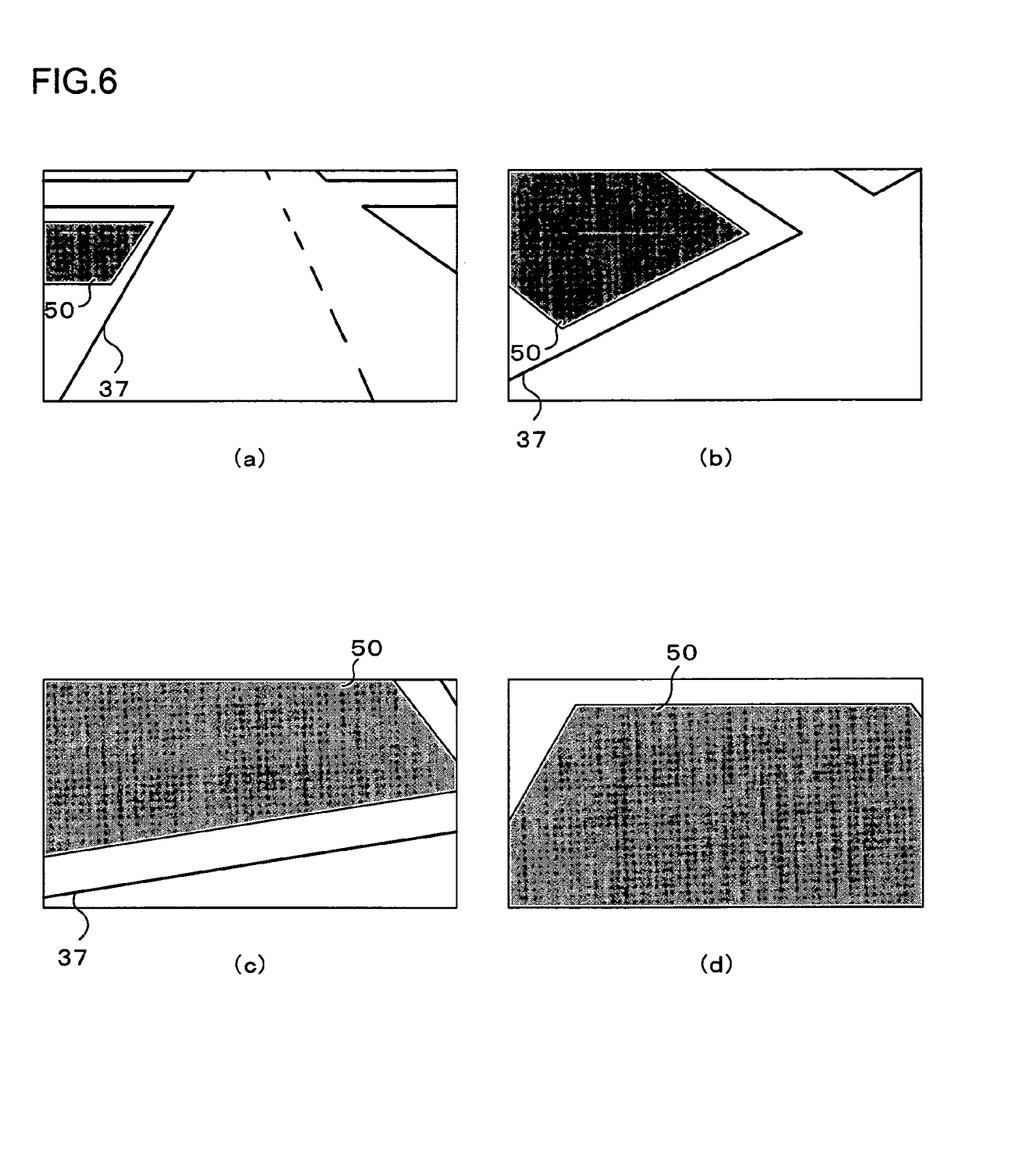
FIG. 6 is examples of images that may be captured with the camera as the vehicle enters the parking area, as illustrated in FIG. 5.

FIG. 6 shows examples of images of the scene ahead of the subject vehicle 100, which may be captured via the camera 2 in the situation illustrated in FIG. 5. The captured images in FIGS. 6(a), 6(b), 6(c) and 6(d) are respectively captured at positions E, F, G and H assumed by the subject vehicle, as shown in FIG. 5. By using these captured images, road marker line detection processing similar to that explained in reference to the first embodiment is executed and then, based upon the road marker line detection results, a decision is made as to whether or not the subject vehicle 100 has moved over a road marker line.

The captured images in FIG. 6 indicate that a road marker line 37 having gradually moved closer to the subject vehicle 100 from the left side, as shown in FIGS. 6(a) to FIG. 6(c), is no longer present in the image shown in FIG. 6(d). Under these circumstances, the subject vehicle 100 can be judged to have moved over the road marker line 37. If the subject vehicle 100 is judged to have moved over the road marker line, as in this example, no map matching is executed until the subject vehicle is next detected to have moved over a road marker line and the uncorrected subject vehicle position is directly indicated on the roadmap just as it has been detected with the current position detection device 14. As a result, the phenomenon is prevented whereby the subject vehicle position is erroneously indicated on a road when the subject vehicle, having entered, for instance, a parking area present at the side of the road is not actually traveling on the road.

Figure 7:
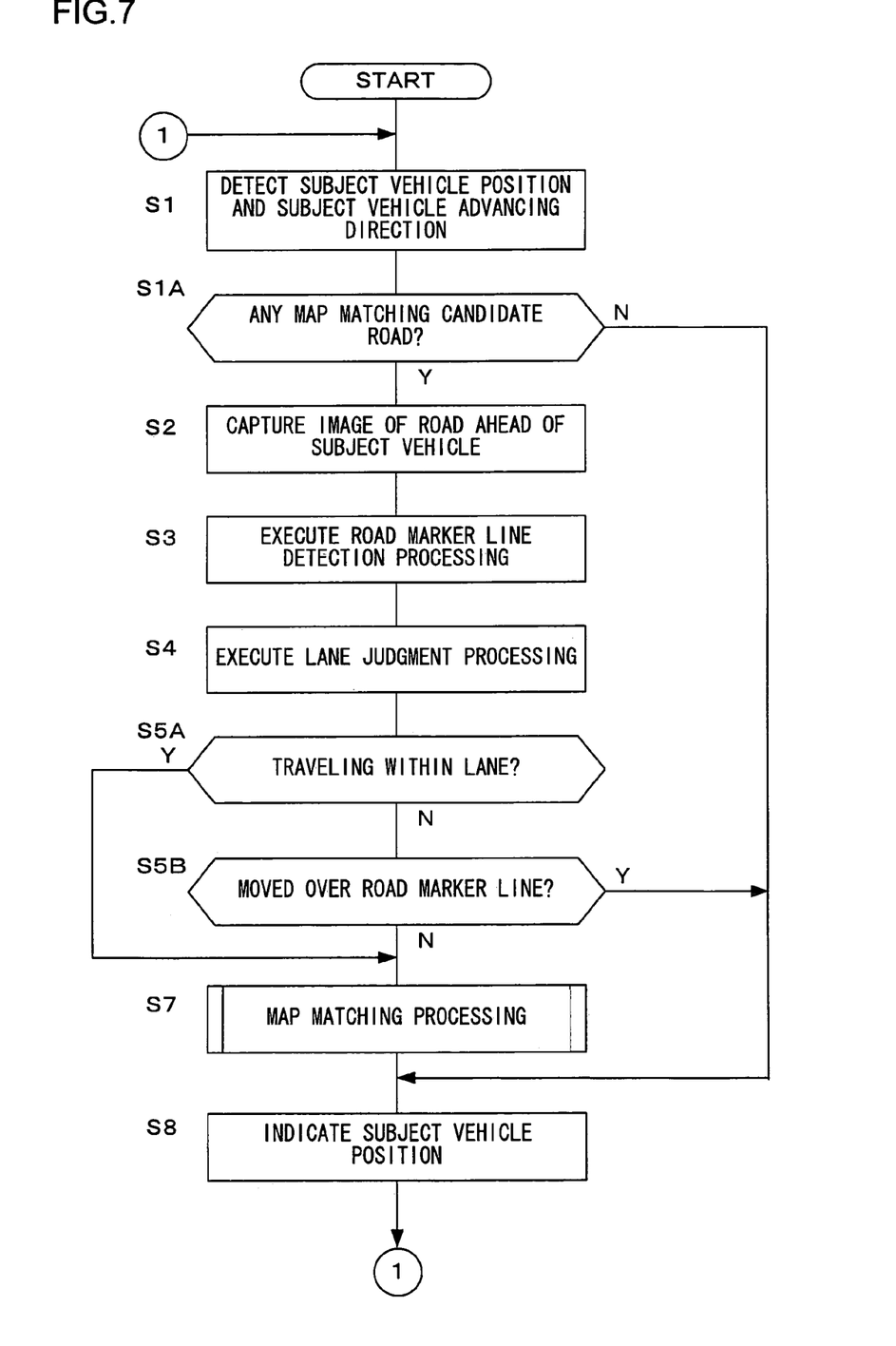
FIG. 7 is a flowchart of the map matching processing executed in a second embodiment.

FIG. 7 presents a flowchart of the map matching processing executed in the embodiment. In the flowchart, the same step numbers are assigned to steps in which processing identical to that in the flowchart presented in FIG. 4, in reference to which the first embodiment has been explained, is executed. The processing executed in the steps assigned with the same step numbers as those in FIG. 4 is not explained below.

In step S1A, a decision is made based upon the subject vehicle position and the subject vehicle advancing direction having been detected in step S1 as to whether or not there is any map matching candidate road. At this time, a road present within the predetermined distance range from the subject vehicle position and extending along a direction running with an angle within the predetermined angle range relative to the subject vehicle advancing direction is identified as a map matching candidate. If it is decided that there is a map matching candidate road having been identified as described above, the operation proceeds to step S2. If, on the other hand, it is decided that no road satisfies these map matching candidate requirements, it is judged that there is no map matching candidate road and the operation proceeds to step S8. In this case, it is assumed that the subject vehicle is not traveling on a road, and accordingly, the uncorrected subject vehicle position, i.e., the subject vehicle position having been detected in step S1, is directly indicated on the roadmap in step S8, without executing the map matching processing in step S7.

In step S5A, a decision is made as to whether or not the subject vehicle is currently traveling within a lane on a road based upon the results of the lane judgment processing having been executed in step S4. If it is decided that the subject vehicle is currently traveling within a lane, the operation proceeds to step S7. Under these circumstances, the subject vehicle is assumed to be traveling on a road and, accordingly, map matching processing is executed in step S7. If, on the other hand, it is decided in step S5A that the subject vehicle is not traveling within a lane, the operation proceeds to step S5B.

In step S5B, a decision is made based upon the results of the road marker line detection processing having been executed in step S3 as to whether or not the subject vehicle has moved over a road marker line. If it is decided that the subject vehicle has moved over a road marker line, the operation proceeds to step S8. In this case, it is assumed that the subject vehicle is not traveling on a road and, accordingly, the uncorrected subject vehicle position is indicated in step S8 without executing the map matching processing in step S7. If, on the other hand, it is decided in step S5B that the subject vehicle has not moved over a road marker line, the operation proceeds to step S7. In this situation, the subject vehicle is assumed to have made a turn at an intersection and, accordingly, the map matching processing is executed in step S7.

The following advantages are achieved in the second embodiment described above.

(1) A decision is made as to whether or not the subject vehicle has moved over a road marker line in the image of the road ahead of the subject vehicle captured by the camera 2 (step S5B) and, if it is decided that the subject vehicle has moved over a road marker line, it is assumed that the subject vehicle is not traveling on the map matching candidate road. In this case, no map matching processing is executed. Thus, the phenomenon whereby the subject vehicle position is erroneously indicated on a road through map matching when the subject vehicle having entered a parking area or the like present at the side of the road, is not actually traveling on the road is prevented.

(2) A decision is made based upon the positional relationship among a plurality of road marker lines detected in the captured image as to whether or not the subject vehicle is currently traveling within a lane (step S5A) and, if the subject vehicle is judged to be traveling within a lane, the subject vehicle is assumed to be traveling on the map matching candidate road. Accordingly, the map matching processing is then executed (step S7) on these assumptions. As a result, the map matching processing is not erroneously skipped when the subject vehicle moves over a road marker line in order to, for instance, switching lanes.

It is to be noted that the lane in which the subject vehicle is traveling is judged and the decision as to whether or not the subject vehicle has moved over a road marker line is made in the embodiments described above by capturing images of the road ahead of the subject vehicle with the camera 2 and detecting road marker lines in the captured images. Alternatively, the camera 2 may capture images of the road behind the subject vehicle. The processing having been explained in reference to the individual embodiments can also be executed in conjunction with images of the road behind the subject vehicle.

The road marker lines detected in the captured images in the embodiments may be various types of traffic control lines painted on roads, e.g., white lines and yellow lines. Alternatively, installations on roads such as traffic medians, instead of road marker lines, may be detected.

While the navigation system explained in reference to the embodiments displays the roadmap based upon map data recorded in a storage medium such as a DVD-ROM, the present invention is not limited to this example. For instance, the present invention may be adopted in a communication navigation system that downloads map data from an information provider center through wireless communication achieved via a portable telephone or the like.

While the invention has been particularly shown and described with respect to preferred embodiments thereof, the present invention is not limited to these examples and it will be understood by those skilled in the art that various changes in form and detail may be made therein without departing from the scope of the invention.

The disclosure of the following priority application is herein incorporated by reference: Japanese Patent Application No. 2004-164744 filed Jun. 2, 2004

The invention claimed is:

1. An on-vehicle navigation apparatus comprising:
 a subject vehicle position detection unit that detects a position of a subject vehicle and a direction along which the subject vehicle is advancing;
 a road marker line detection unit that detects a road marker line in an image of a road ahead of or behind the subject vehicle captured with a camera;
 a map matching candidate identifying unit that identifies a road to be designated as a map matching candidate based upon the subject vehicle position and the subject vehicle advancing direction detected by the subject vehicle position detection unit;
 a decision-making unit that makes a decision based upon results of road marker line detection by the road marker line detection unit as to whether or not the subject vehicle is traveling on the road identified by the map matching candidate identifying unit;
 a map matching unit that corrects the subject vehicle position detected by the subject vehicle position detection unit so as to set the subject vehicle position onto the road on which the subject vehicle is determined by the decision-making unit to be traveling; and
 a subject vehicle position indicating unit that indicates the subject vehicle position having been corrected by the map matching unit on a roadmap, wherein:
 the decision-making unit is configured to make a decision as to whether or not the subject vehicle has moved over a road marker line based upon results of road marker line detection by the road marker line detection unit, and the decision-making unit determines that the subject vehicle is not traveling on the road having been identified by the map matching candidate identifying unit if the subject vehicle is judged to have moved over a road marker line; and
 when the decision-making unit has determined that the subject vehicle is not traveling on the road having been identified by the map matching candidate identifying unit, the map matching unit stops correcting the subject vehicle position detected by the subject vehicle position detection unit, and the subject vehicle position indicating unit indicates the subject vehicle position detected by the subject vehicle position detection unit.

2. An on-vehicle navigation apparatus according to claim 1, wherein:
 the decision-making unit is configured to make a decision as to whether or not the subject vehicle is traveling within a lane based upon a positional relationship indicated on a screen with regard to a plurality of road marker lines detected by the road marker line detection unit, and the decision-making unit determines that the subject vehicle is traveling on the road having been identified by the map matching candidate identifying unit if the subject vehicle is judged to be traveling within a lane regardless of results of the decision as to whether or not the subject vehicle has moved over a road marker line; and
 when the decision-making unit has determined that the subject vehicle is traveling on the road having been identified by the map matching candidate identifying unit, the map matching unit executes correcting the subject vehicle position detected by the subject vehicle position detection unit.

3. A subject vehicle position correction method adopted in an on-vehicle navigation apparatus, comprising:
 detecting a position of a subject vehicle;
 identifying a road to be designated as a map matching candidate based upon the subject vehicle position having been detected;
 making a decision based upon an image captured via a camera as to whether or not the subject vehicle is traveling on the identified road by making a decision as to whether or not the subject vehicle has moved over a road marker line;
 when the subject vehicle is judged to be traveling on the identified road, correcting the subject vehicle position so as to set the subject vehicle position onto the road on which the subject vehicle is judged to be traveling; and
 when the subject vehicle is not judged to be traveling on the identified road, stopping correcting the subject vehicle position.

* * * * *

UNITED STATES PATENT AND TRADEMARK OFFICE
CERTIFICATE OF CORRECTION

PATENT NO.         : 7,653,482 B2                                    Page 1 of 1
APPLICATION NO. : 11/597937
DATED              : January 26, 2010
INVENTOR(S)        : Akio Sumizawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this

Fourth Day of January, 2011

David J. Kappos
*Director of the United States Patent and Trademark Office*